(12) United States Patent
Kimura et al.

(10) Patent No.: US 8,426,825 B2
(45) Date of Patent: Apr. 23, 2013

(54) RADIATION IMAGE PICKUP DEVICE

(75) Inventors: Kenji Kimura, Yamatokoriyama (JP); Shoichi Okamura, Nara (JP)

(73) Assignee: Shimadzu Corporation, Kyoto (JP)

( * ) Notice: Subject to any disclaimer, the term of this patent is extended or adjusted under 35 U.S.C. 154(b) by 237 days.

(21) Appl. No.: 12/934,503

(22) PCT Filed: Mar. 25, 2008

(86) PCT No.: PCT/JP2008/055595
§ 371 (c)(1), (2), (4) Date: Sep. 29, 2010

(87) PCT Pub. No.: WO2009/118832
PCT Pub. Date: Oct. 1, 2009

(65) Prior Publication Data
US 2011/0024643 A1    Feb. 3, 2011

(51) Int. Cl.
*G01T 1/24* (2006.01)
(52) U.S. Cl.
USPC .................................................. 250/370.09
(58) Field of Classification Search ............... 250/370.09
See application file for complete search history.

(56) References Cited

U.S. PATENT DOCUMENTS 5,061,630 A * 10/1991 Knopf et al. ................... 422/500
2006/0076500 A1 * 4/2006 Watanabe ................ 250/370.15

FOREIGN PATENT DOCUMENTS

| EP | 1811644 A1 * | 7/2007 |
|---|---|---|
| JP | 11-271456 A | 10/1999 |
| JP | 11-344573 A | 12/1999 |
| JP | 2003-14860 A | 1/2003 |
| JP | 2005-128000 A | 5/2005 |
| JP | 2006-325631 A | 12/2006 |

* cited by examiner

*Primary Examiner* — David Porta
*Assistant Examiner* — Hugh H Maupin
(74) *Attorney, Agent, or Firm* — McDermott Will & Emery LLP

(57) ABSTRACT

A radiation image pickup device comprises temperature control means for maintaining the temperature of an X ray conversion layer to be substantially constant by performing a feedback process for controlling a voltage which is applied to the Peltier element based on the temperature of the X ray conversion layer. The temperature control means starts reading out an electric charge from each pixel (DU), then converts the electric discharge to voltage with a charge amplifier and in a period until an A/D conversion process for the voltage is completed, and restricts a variation in the voltage which is applied to the Peltier element.

3 Claims, 5 Drawing Sheets

(I) Frame Synchronizing Signal (II) X-ray Illuminating Interval (III) Reading Interval (IV) True Driving Voltage (V) Driving Voltage after Constraints

RADIATION IMAGE PICKUP DEVICE

CROSS REFERENCE TO PRIOR APPLICATIONS

This application is a U.S. National Phase application under 35 U.S.C. §371 of International Application No. PCT/JP2008/055595, filed on Mar. 25, 2008. The International Application was published in Japanese on Oct. 1, 2009 as WO 2009/118832 A1 under PCT Article 21(2), which is herein incorporated by reference.

FIELD OF TECHNOLOGY

The present invention relates to a radiographic imaging device for detecting radiation and outputting an image signal, and in particular, relates to a radiographic imaging device provided with a structure for performing a temperature control using a Peltier element.

BACKGROUND OF THE INVENTION

Conventional radiographic devices are structured such as illustrated in FIG. 6. The radiation that is incident into the radiographic device is converted into an electric charge through an x-ray converting layer 2 that is structured from a semiconductor thick-film such as amorphous selenium. This charge is read out by a bias voltage $V_A$ that is applied between a bias applying electrode 1, which is provided on the incident radiation side of the x-ray converting layer 2, and the ground side of a capacitor Ca, described below, through a TFT substrate 3 that is provided on the side that is opposite of the bias applying electrode 1. This TFT substrate 3 has pixel electrodes 31 that are disposed in the form of a matrix in order to collect the electric charge, capacitors Ca that are connected to the pixel electrodes 31, and thin-film transistor elements Tr, with the sources thereof connected to the capacitors Ca. Note that the region wherein a single pixel electrode 31 is able to collect charge shall be termed the applicable pixel DU, below. The TFT substrate 3 has gate lines G wherein the gates of all of the thin-film transistor elements Tr belonging to the same row are connected in common, and data lines G, wherein the drains of all of the thin-film transistor elements Tr that belong to the same column are connected in common, where the number of gate lines G and the number of data lines D are equal to the number of rows and columns, respectively.

The charge that is produced in the pixel DU is stored in the capacitor Ca through the corresponding pixel electrode 31. When the charge that is stored causes the potential of the gateline G of the column to which the pixel DU belongs to reach the ON potential, then the thin-film transistor elements TR is turned ON, and that charge is read out on the dataline of the column to which the pixel DU belongs. The potential of a gateline G for an individual row is controlled by a gate driving circuit 5.

On the other hand, the TFT substrate 3 is held on one of the surfaces of a base substrate 4, made of aluminum, or the like, and amplifier and A/D converter circuits 6 are disposed on the other surface of this base substrate. The data lines D of the TFT substrate 3, and charge amps 61 of the amplifier and A/D converting circuits 6 are connected by a flexible circuit board 63. The charge that is read out to the data line D is converted into a voltage by the charge amp 61, and after conversion into a pixel value by an A/D converter circuit 62 that is connected to the charge amp 61, [the data value] is stored to a memory unit 71.

After this process has been performed for all of the pixels DU that are subject to reading, then the pixel values that have been stored in the memory unit 71 are sent to an image processing device 8. This series of operations is controlled by a controller 7. (See, for example, Japanese Unexamined Patent Application Publication 2006-325631.)

In a radiographic device structured in this way, there is a problem in that changes in temperature can cause damage to the x-ray converting layer 2, and can cause peeling or cracking of the layer due to differences in the coefficients of thermal expansion from that of the active-matrix substrate on which is formed the thin-film transistor elements, which has the x-ray converting layer 2.

Given this, a radiographic device further comprising a thermistor 91 for detecting the temperature of the x-ray converting layer 2, a Peltier element 92 for changing the temperature of the x-ray converting layer 2, and temperature controlling means for controlling a voltage applied to the Peltier element 92 based on the detected temperature, has been proposed. (See, for example, Japanese Unexamined Patent Application Publication 2003-014860.)

However, a problem of there being noise in the element arises accompanying the driving of the Peltier element 92. Experimentation by the inventor has confirmed the superimposition of linear noise, as illustrated in FIG. 7, in particular. Because the location and timing with which the noise is superimposed is unspecified, there is a problem in that it is not possible to perform uniform corrections. The present inventors, through experimentation, have discovered that this problem occurs when there is variation in the driving voltage for the Peltier element 92 during the interval prior to the completion of the A/D conversion after the beginning of reading of the charge when the gate controlling means are open, and discovered that if the frequency of this fluctuation is high, then the noise becomes remarkable. The object of the present invention is to provide a high-quality image with low noise through controlling the noise in a radiographic device accompanying temperature control using a Peltier element.

SUMMARY OF THE INVENTION

In order to solve the problem set forth above, the radiographic device according to the present invention comprises: an x-ray converting layer for converting radiation into electric charge; a bias applying electrode, provided at the incident radiation side of the x-ray converting layer; pixel electrodes, provided in the form of a matrix, on the side opposite from a common electrode; a switching element provided corresponding to each pixel electrode; gate controlling means for controlling the opening of the switching element; a charge amp for converting into voltage charge that is read out through the switching element; an A/D converting circuit for converting into a digital value a voltage detected by the charge amp; a temperature detecting element for detecting the temperature of the x-ray converting layer; a Peltier element for changing the temperature of the x-ray converting layer; and temperature controlling means for controlling a voltage applied to the Peltier element; wherein: during the reading interval after the switching element is opened by the gate controller and the reading out of the electric charge has commenced up through the completion of the A/D conversion, the temperature controlling means constrain, to no more than a predetermined frequency, the variations in the control voltage.

The predetermined frequency is preferably 0 Hz, where the temperature controlling means preferably perform PWM control of the rise and fall of the control voltage during an interval other than the reading interval after the gate controlling means are opened and the reading out of the electric charge has commenced up through the completion of the A/D conversion.

(Operation) The fluctuations of the driving voltage of the Peltier element during the aforementioned interval are controlled, controlling the noise that is superimposed on the image. If the voltage does not vary at all during this interval, then there will be no superimposition of noise caused by the driving of the Peltier element. Furthermore, when controlling the voltage, power corresponding to the difference between the reference voltage and the voltage being controlled (that is, the voltage drop) is wasted. Because heat is produced commensurate with the wasted power, this leads to an increase in temperature of the radiographic device through heating, reducing the heat controlling efficiency. Given this point, while with PWM control it is possible to minimize the wasted power, because this is pulse control, large fluctuations in voltage are produced when the voltage falls or rises. Consequently, the amount of noise superimposed on the image is large. This problem is resolved through control wherein the switching of the Peltier element driving voltage ON and OFF is not performed during the reading interval.

The radiographic device according to the present invention is able to provide an excellent image wherein there is no superimposition, onto the image, of noise caused by the driving of the Peltier element, or wherein the that superimposition is controlled. Furthermore, structuring the present invention using PWM control is able to minimize the power consumption and able to eliminate the superimposition of noise due to the driving of the Peltier element.

DETAILED DESCRIPTION OF THE INVENTION

Figure 1:
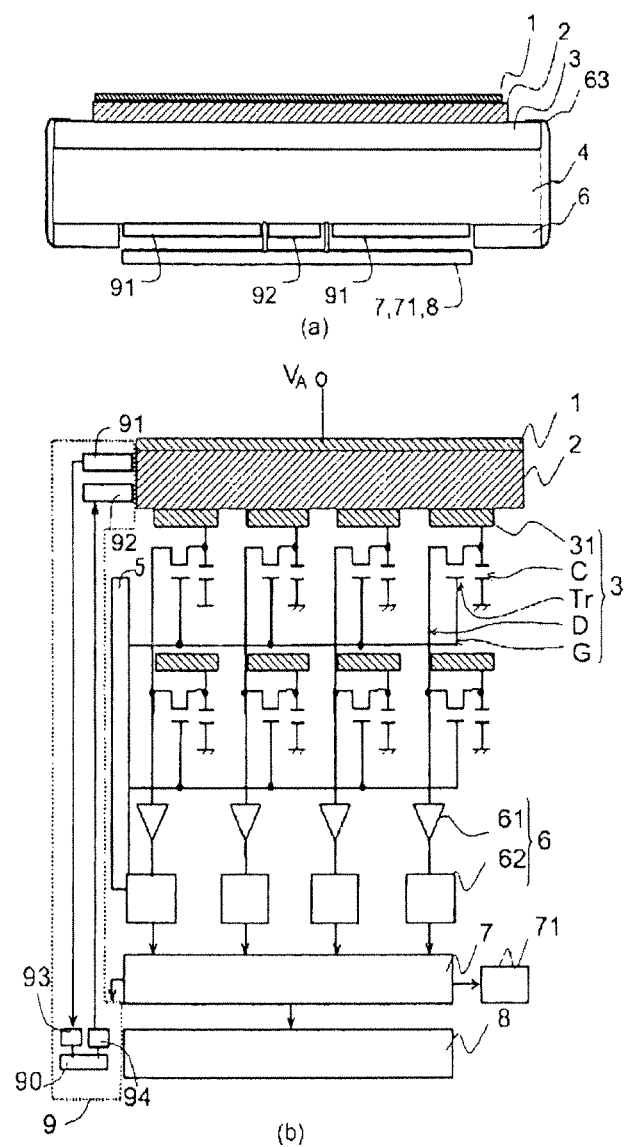
FIG. 1 is a block diagram illustrating the schematic structure of a radiographic device as set forth in the present invention.
Figure 6:
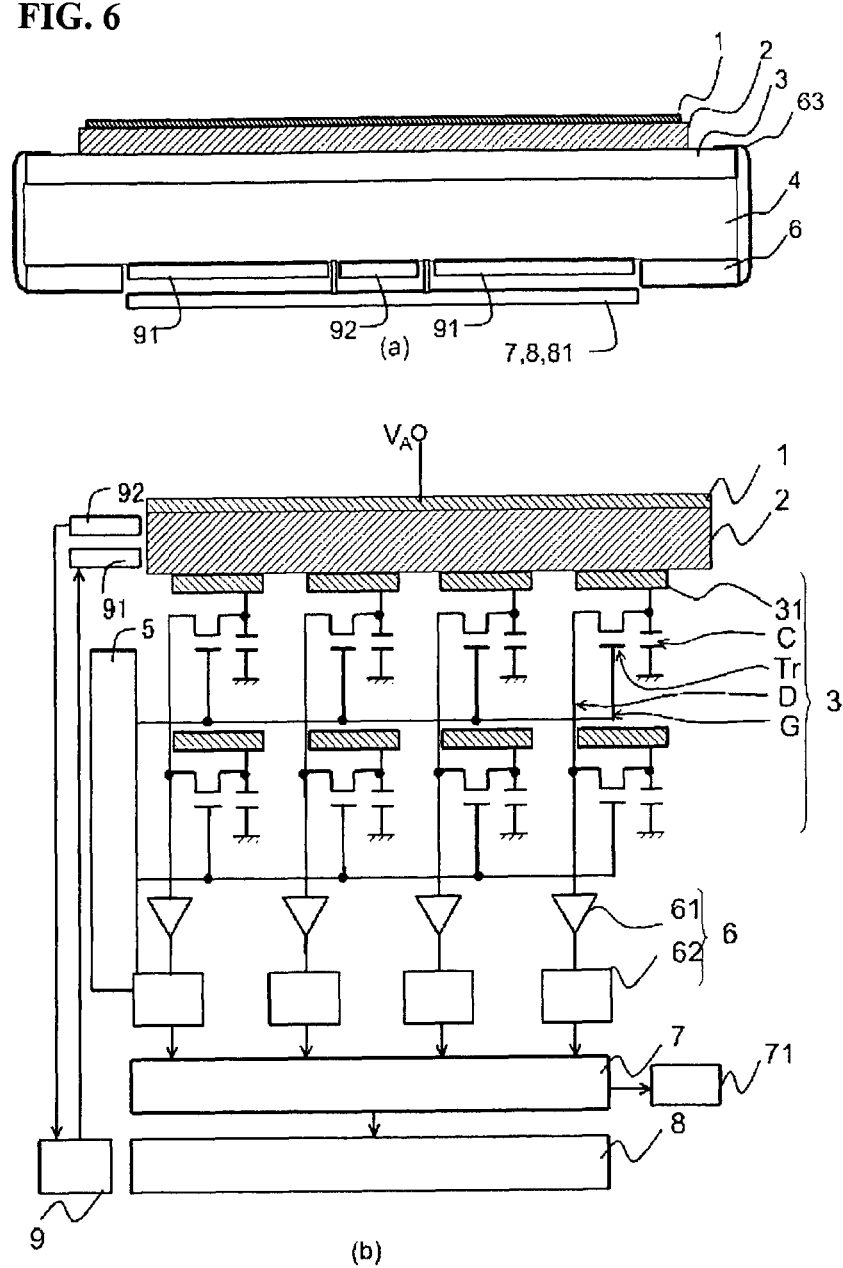
FIG. 6 is a block diagram illustrating a schematic structure for a conventional radiographic device.
Figure 7:
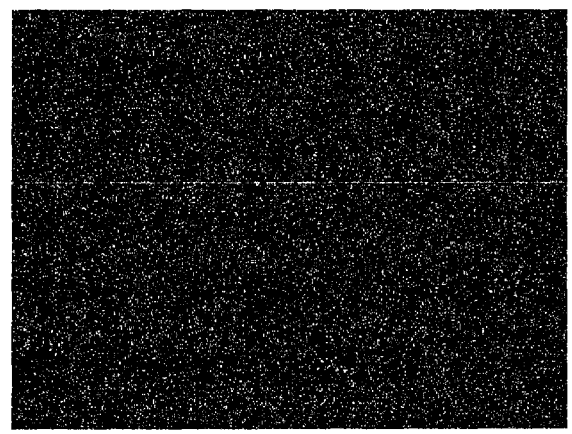
FIG. 7 is an image with superimposed noise obtained from a conventional radiographic device.

A summary of the radiographic device according to the present invention is illustrated in FIGS. 1 (a) and (b). The temperature controlling means 9 are structured fundamentally identically to the conventional structure illustrated in FIG. 6, with the exception of the point wherein a controller 7 is connected.

The controller 7 obtains a frame synchronizing signal from the image processing device 8. Here the frame synchronizing signal is a pulse train that is produced with each interval that is an integer multiple of a minimum frame, and that is longer than the x-ray radiation expectation time that is set by an operator in an x-ray generating device, not shown, wherein typically the minimum frame is 33 ms. Depending on the system, the frame synchronizing signal may be static. On the other hand, the frame generating signal is sent also to the x-ray generating device, where x-rays are illuminated towards the radiographic device using the frame generating signal as a reference.

The incident x-rays are converted into charge by the x-ray converting layer 2 that is structured from a semiconductor thick-film. The charge is collected in pixel electrodes that are disposed in the form of a matrix on the opposite side from bias applying electrodes 1, through a bias voltage $V_A$ that is applied to the bias applying electrodes 1 that are provided on the incident radiation side of the x-ray converting layer 2. The accumulated charge is stored in capacitors Ca that are provided corresponding to the individual pixel electrodes 31. Furthermore, the accumulated charge is read out to the data line D that that is connected to the thin-film transistor elements Tr that belong to the same column, when the thin-film transistor elements Tr that has the source thereof connected to the pixel electrode 31 and the capacitor Cs is turned ON.

The controller 7 operates the gate driving circuit 5 to turn the thin-film transistor elements Tr ON sequentially after an x-ray illuminating interval and a blinking interval have elapsed after the frame synchronization signal has gone low. The charge that is read out to the data line D is converted into a voltage by a charge amp 61 that is connected to the data line D, and is converted into a digital value by an A/D converting circuit 62 that is connected to the charge amp 61, which digital value is stored in the memory unit 71, where, upon the completion of the reading of all of the applicable pixels DU, after the digital values have been stored to the memory unit 71, the data that is stored in the memory unit 71 is sent to the image processing unit 8. Moreover, the controller 7 outputs a reading interval-in-process signal to the temperature controlling means 9.

The temperature controlling means 9 comprise a thermister 91, a Peltier element 92, an A/D converting circuit 93 for converting the voltage signal of the thermistor 91 into a digital signal, a D/A a converting circuit 94 for outputting a voltage to the Peltier element 92, and a CPU 90. The software loaded into the CPU 90 uses, as inputs, the reading interval-in-process signal that is outputted from the controller 7 and the digital values from the A/D converter circuit 93, to determine the control voltage value for the Peltier element 92, outputted into the D/A converting circuit 94. This software and the structure of the controller 7 are explained in detail in Examples of Embodiment 1 through 3, below.

Figure 2:
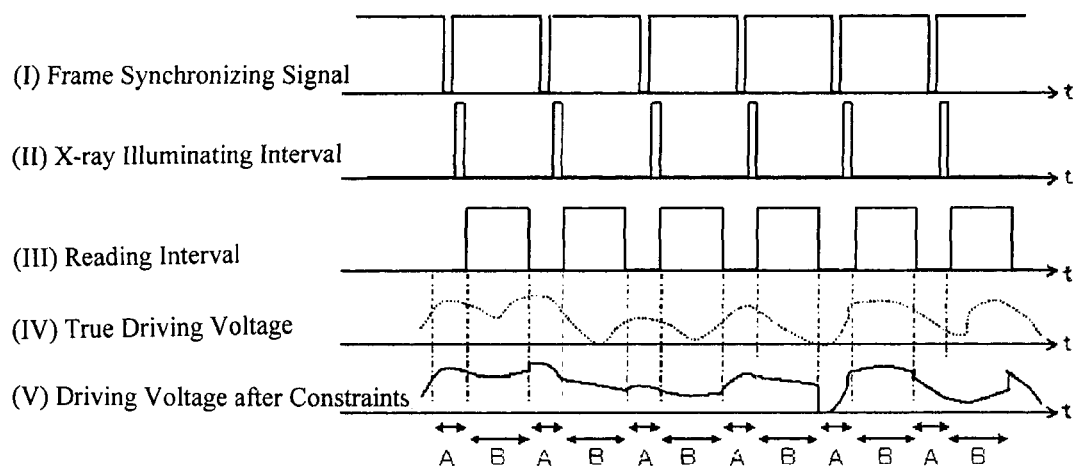
FIG. 2 is a diagram illustrating the control timing of the Peltier element according to a first example of embodiment.

(Example of Embodiment 1) The present example of embodiment will be explained in reference to FIG. 2. In FIG. 2, the aforementioned frame synchronization signal (I), the aforementioned x-ray illumination interval (II), the reading interval-in-processes signal (III), the driving voltage (IV) that should actually be applied to the Peltier element 92, and the driving voltage that is actually applied to the Peltier element 92 (V) are each shown aligned with the respective time marks.

The controller 7, after activating the aforementioned the gate circuit 5, outputs a reading interval-in-process (III) that is at the H level over the interval until the conversion, to digital values, of the voltages corresponding to each of the pixels DU that are to be read has been completed, and a L level during all other intervals. Note that the frame period is anticipated to be 266 ms, and the reading interval is anticipated to be about 120 ms. The reading period requires a time that is the number of pixels multiplied by (the time required for the voltage in the charge amp 61 to stabilize added to the time for the conversion in the A/D converting circuit 62). Note that this reading interval can be shortened by providing a plurality of A/D converting circuits and operating the circuits in parallel.

The software relating to the present example of embodiment has a feedback control task for repeating the Steps S11 through S15, below, with a predetermined period.

(Step S11) Read the voltage signal value $I_{AD}$ of the thermistor 91. Also read the reading interval-in-processes signal (III) from the controller 7.

(Step S12) Calculate the current temperature T, through linear approximation, from the value $I_1$, read in from the A/D converting circuit 93 when the temperature of the Thermistor 91 is at $T_1$, stored in advance, the value $I_2$, read in from the A/D converting circuit 93 when the temperature of the thermistor 91 is at $T_2$, stored in advance, and from $I_{AD}$. At its simplest, this is calculated as follows:

$$T=\{(T_1-T_2)\cdot(I_1-I_{AD})/(I_1-I_2)\}+T_1.$$

(Step S13) Determine the voltage value $V_P$ that should be outputted to the Peltier element from the relationship between the target temperature $T_0$ and the current temperature T. At the simplest differential control, $V_P=\alpha\cdot(T_0-T)$, is adequate, where $\alpha$ is a coefficient, and the larger the coefficient, the more rapid the tracking; however, this can also cause hunting, and thus the optimal value should be set in accordance with the thermal time constant of the system. When PID control is used for the control, temperatures T from several times previous through the current temperature are stored in memory, where the integral value and the derivative value may be multiplied by respective coefficients and applied to the aforementioned differential control value. The method by which to determine $V_P$ may be replaced easily with other well-known control technologies, and because how this determination is made is not related to the essence of the present invention, detailed explanations thereof are omitted.

(Step S14) When the reading interval-in-process signal (III) is at the H level (the interval B in FIG. 2), then, in order to prevent a change in $V_P$, the value for $V_P$ is calculated again. For example, the driving voltage (V) after control such as in FIG. 2 is obtained through recalculating $V_P$ as follows.

$$V_p = \begin{cases} V_p & : |V_p - V_{prev}| \le V_{th} \\ V_{prev} + V_{th} & : V_p - V_{prev} > V_{th} \\ V_{prev} - V_{th} & : V_{prev} - V_p < V_{th} \end{cases} \quad \text{[Formula 1]}$$

Note that if $V_{th}$ is set to 0, then when the reading interval-in-process signal (III) is at the H level, then there will be no fluctuation whatsoever in the driving voltage for the Peltier element 92. This corresponds to the fluctuation frequency of the driving voltage being 0.

(Step S15) Output this determined $V_P$ to the D/A converting circuit 94. Store the outputted $V_P$ as $V_{prev}$.

Note that the specific period is preferably as short as possible within the scope of processing capability of the CPU 90. For example, when using a CPU for a combination that operates with a clock that is several dozen megahertz, the period may be in the range of several milliseconds to 20 ms. Faster operations can be anticipated through performing similar operations using logic structured from an FPGA (Field Programmable Gate Array).

While in the present example of embodiment there is a recalculation so that the difference from the output value from the previous time is simply no greater than a threshold value, this may be replaced with a variety of different recalculation methods, such as maintaining a history of $V_P$ over a specific period previously, and then performing a one-dimensional Fourier transform, and then, after removing components of frequencies higher than a specific threshold value, performing a reverse Fourier transform, to recalculate the $V_P$. That is, insofar as the frequency of the driving voltage for the Peltier element 92 during the reading interval is lower than in the other interval (portion), the method for performing the calculation may be varied in a variety of ways, and all are included within the present invention.

(Second Example of Embodiment) A second example of embodiment as set forth in the present invention will be explained in reference to FIG. 3. As with FIG. 2, FIG. 3 also illustrates changes in the various signals over time. In the program in the present example of embodiment, the feedback control task repeats the Steps S21 through 24, below, with a specific period. Note that, aside from the program, the structures are identical to that of the first example of embodiment, and thus explanations thereof are omitted.

(Step S21) Read in the voltage signal value $I_{AD}$ of the thermistor 91 from the A/D converting circuit 93.

(Step S22) This is identical to Step S12 in the first example of embodiment, and thus the explanation thereof is omitted.

(Step S23) This is identical to Step S13 in the first example of embodiment, and thus the explanation thereof is omitted.

(Step S24) Convert the determined $V_P$ into a duty ratio D, and send to the PWM task. Store $V_P$ as $V_{prev}$. Here the duty ratio D is calculated as described below. $D=V_P/V_{max}$, where $V_{max}$ is the maximum value that can be outputted by the D/A converting circuit. Consequently, $-1 \le D \le 1$.

On the other hand, PWM task performs the following steps P21 through P25 with a period that is shorter than that of the feedback control task.

(Step P21) Read the reading interval-in-process signal (III) from the controller 7.

(Step P22) Determine, as follows, the voltage $V_S$ that should be outputted to the D/A converting circuit 94:

$$V_s = \begin{cases} V_{max} & : C \le (D \times C_{max}) \text{ and } D > 0 \\ 0 & : C > (D \times C_{max}) \text{ or } D = 0 \\ -V_{max} & : C \le (D \times C_{max}) \text{ and } D < 0 \end{cases} \quad \text{[Formula 2]}$$

Here C is a counter variable value, where $C_{max}$ is the maximum value for C, and corresponds to the resolution of the PWM waveform.

(Step P23) When the reading interval-in-process signal (III) is at the H level (the interval B in FIG. 2), replace $V_S$ with $V_{SPrev}$, which is the previous $V_S$. That is, the status of $V_S$ does not change while the reading interval-in-process signal (III) is at the H value.

(Step P24) Output, to the D/A converting circuit 94, the $V_S$ that has been determined. Save, as $V_{Sprev}$, the $V_S$ that has been outputted.

(Step P25) Increment C. If $C>C_{max}$, then replace C with 0.

Figure 3:
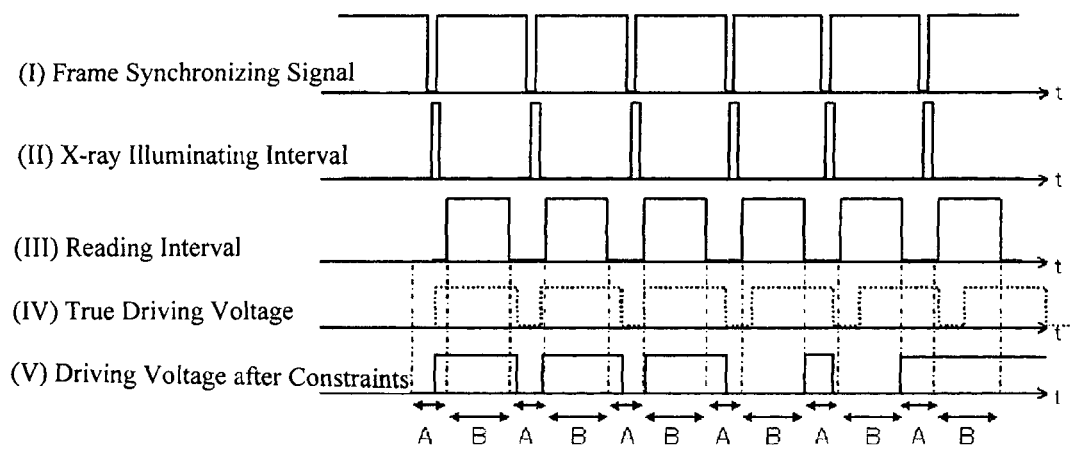
FIG. 3 is a diagram illustrating the control timing of the Peltier element according to a second example of embodiment.

In this type of control, the actual waveform that should be used for driving, as illustrated in (IV) of FIG. 3, is constrained to the waveform such as (V), enabling the PWM control to be performed without changing the driving voltage of the Peltier element 92 during the interval B. Note that because the present example of embodiment is able to control the control period for the PWM and the period for the frame synchronization signal independently of each other, this is useful from the perspective of independence of control.

Figure 4:
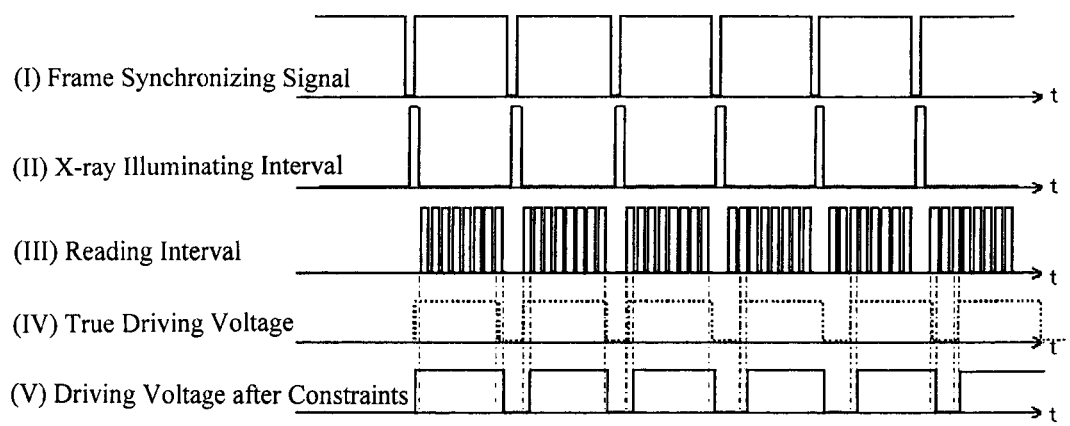
FIG. 4 is a diagram illustrating the control timing of the Peltier element according to a third example of embodiment.

(Third Example of Embodiment) A third example of embodiment according to the present invention will be explained in reference to FIG. 4. As with FIG. 3, FIG. 4 illustrates the changes over time in each of the signals. The program, and the like in the present example of embodiment are also identical to that in the second form of embodiment, and the only discrepancies are in the operation of the controller 7.

The controller 7 activates the gate driving circuits 5 sequentially. At this time, a short wait period is inserted each time the gate line G is activated for a specific row. In this state, the reading interval-in-process signal (3) is outputted so as to be at the H level over the interval from the beginning of driving of the gate line G until the end of the conversion, to digital values, of the voltages corresponding to the pixels DU of the specific row, and so as to be at the L level during all other intervals (FIG. 4). Doing so distributes the interval B over which the state of the signal can be changed.

The specific interval may be a single row, or may be about half of all of the rows. Insofar as the x-ray illumination and the reading operation can be performed within the scope of the frame period, preferably the value for the specific rows is as small as possible, and many waiting intervals are inserted.

The structure set forth above enables the changes in the driving voltages for the Peltier element 92 to be eliminated during the reading interval, while relaxing the constraint on the PWM waveform.

Figure 5:
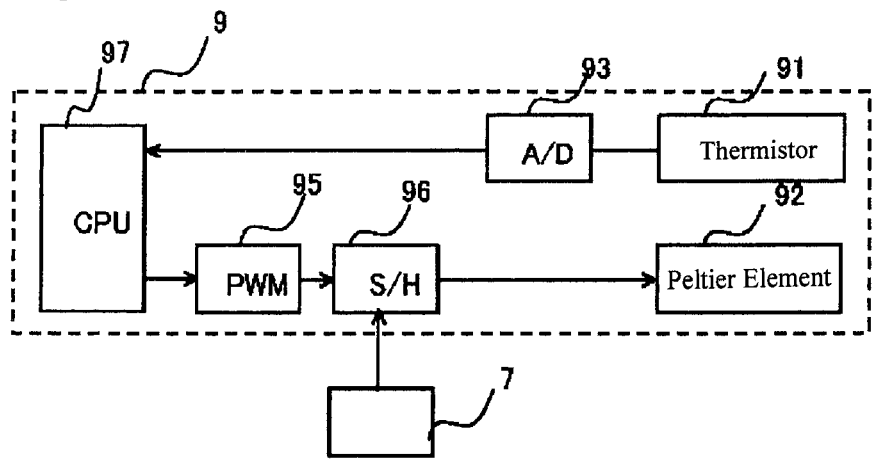
FIG. 5 is a diagram illustrating a structure for the temperature controlling means according to a fourth example of embodiment.

(Fourth Example of Embodiment) The structures for achieving in hardware functions that are identical to those in the second and third examples of embodiment, described above, are illustrated in FIG. 5 as a fourth example of embodiment. Note that the structures aside from the temperature controlling means 9 in the present example of embodiment, and the feedback control for determining the output, with the input being the digital values from the A/D converting circuit 93, are identical to those in the other examples of embodiment, and thus explanations thereof are omitted.

The temperature controlling means 9 in the present example of embodiment comprise a thermistor 91, a Peltier element 92, an A/D converting circuit 93 for converting to a digital value the voltage value of the thermistor 91, a PWM controlling circuit 96 for controlling, with a PWM waveform, the driving voltage of the Peltier element 92, a sampling hold circuit 95 for holding, over the interval over which the reading interval-in-process signal (III) is at the H level, the output value from the PWM controlling circuit 96, at the point in time of the rising edge of the reading interval-in-process of signal (III) from the controller 7, and a CPU 90. The software that is loaded into the CPU 90 calculates and outputs a duty ratio to the PWM controlling circuit 96 with the digital value from the A/D converting circuit 93 as the input. This function can minimize the power consumption, and can eliminate the superimposition of noise due to the driving of the Peltier element.

The invention claimed is:

1. A radiographic device, comprising:
an x-ray converting layer converting radiation into an electric charge;
a bias applying electrode, provided at the incident radiation side of the x-ray converting layer;
pixel electrodes, provided in the form of a matrix, on the side opposite from a common electrode;
a switching element provided corresponding to each pixel electrode;
a gate controller controlling the opening of the switching element;
a charge amp converting into a voltage that is read out through the switching element;
an A/D converting circuit converting into a digital value the voltage converted by the charge amp;
a temperature detecting element detecting the temperature of the x-ray converting layer;
a Peltier element changing the temperature of the x-ray converting layer; and
a temperature controller controlling a voltage applied to the Peltier element, wherein:
during the reading interval after the switching element is opened by the gate controller and the reading out of the electric charge has commenced up through the completion of the A/D conversion, the temperature controller controls a frequency of the voltage applied to the Peltier element to be lower than a frequency of the voltage applied to the Peltier element in an interval other than the reading interval.

2. The radiographic device as set forth in claim 1, wherein the voltage applied to the Peltier element is unmodulated.

3. The radiographic device as set forth in claim 2, wherein the temperature controller performs PWM control such that the rising and falling of the control voltage is not performed during the reading interval.

* * * * *